US 10,482,223 B1

United States Patent
Sokolov et al.

(10) Patent No.: US 10,482,223 B1
(45) Date of Patent: Nov. 19, 2019

(54) SYSTEMS AND METHODS FOR SELECTING QUESTIONS FOR KNOWLEDGE-BASED AUTHENTICATION BASED ON SOCIAL ENTROPY

(71) Applicant: Symantec Corporation, Mountain View, CA (US)

(72) Inventors: Ilya Sokolov, Boston, MA (US); Kevin Jiang, Lafayette, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 509 days.

(21) Appl. No.: 15/073,691

(22) Filed: Mar. 18, 2016

(51) Int. Cl.
*G06F 21/31* (2013.01)

(52) U.S. Cl.
CPC .................................... *G06F 21/31* (2013.01)

(58) Field of Classification Search
CPC ............. G06F 21/31; G06F 2221/2133; H04L 9/0675; G06N 20/00; G06N 5/02; G06N 5/04
See application file for complete search history.

(56) References Cited

U.S. PATENT DOCUMENTS

| 9,009,844 | B1* | 4/2015 | Corn | H04L 9/3271 |
| | | | | 726/27 |
| 2003/0191947 | A1* | 10/2003 | Stubblefield | G06F 21/36 |
| | | | | 713/183 |
| 2008/0288338 | A1* | 11/2008 | Wiseman | G06Q 30/02 |
| | | | | 705/14.69 |

OTHER PUBLICATIONS

Fenton, Jim, "How much entropy is in a name?", https://altmode.org/2015/01/14/how-much-entropy-is-in-a-name/, as accessed Mar. 3, 2016, (Jan. 14, 2015).

* cited by examiner

*Primary Examiner* — Abiy Getachew
(74) *Attorney, Agent, or Firm* — FisherBroyles, LLP

(57) ABSTRACT

The disclosed computer-implemented method for selecting questions for knowledge-based authentication based on social entropy may include (1) identifying a potential question to ask a user of a computing system during a KBA process in an attempt to verify the user's identity, (2) determining whether any information suggestive of a correct answer to the potential question is available to anyone other than the user of the computing system, (3) calculating a social entropy of the potential question based at least in part on the determination of whether any information suggestive of the correct answer is available to anyone other than the user, and then (4) selecting the potential question to be asked to the user during the KBA process based at least in part on the social entropy of the potential question. Various other methods, systems, and computer-readable media are also disclosed.

17 Claims, 8 Drawing Sheets

```
                          Potential Question
                                122(2)
------------------------------------------------------------------------
************************************************

Who was your employer in 2007?

************************************************
------------------------------------------------------------------------
```

```
                             Social Media
                                  502
------------------------------------------------------------------------
************************************************

USER:                    John Doe

EMPLOYMENT HISTORY:      SuperStore      October 2001 – December 2005
                         MegaTech        January 2006 – August 2011
                         HopeFinancial   September 2011 – Present

```
                          Potential Question
                              122(1)

-----------------------------------------------------------------------
************************************************

Which restaurant did you dine at last Friday night?

************************************************
-----------------------------------------------------------------------
```

```
                           Telemetry Data
                                602

-----------------------------------------------------------------------
************************************************

USER:              John Doe

LOCATION:          Pepper Garden in Palo Alto, CA
DATE:              Friday, 4 March 2016
TIME:              8:10 PM PST

PAYMENT:           $89.49

SYSTEMS AND METHODS FOR SELECTING QUESTIONS FOR KNOWLEDGE-BASED AUTHENTICATION BASED ON SOCIAL ENTROPY

BACKGROUND

Knowledge-Based Authentication (KBA) is often used to verify a person's identity by having that person answer certain questions that involve facts about his or her life. In one example, KBA may help prove the alleged identity of a person trying to gain access to an online account. For example, in the event that an email user has forgotten his or her password, the user's email provider may attempt to verify the user's alleged identity via KBA before granting him or her access to the email account. In this example, KBA may enable the user to prove his or her alleged identity and then recover his or her email account despite forgetting the password.

Unfortunately, conventional approaches to KBA may have certain flaws and/or vulnerabilities that enable a person to spoof the identity of another to gain illegitimate access to his or her accounts. In one example, a conventional approach to KBA may involve asking a person trying to gain access to an online account to provide the maiden name of the account owner's mother. This conventional approach, however, may fall short of proving the person's alleged identity because others (e.g., family members, friends, and/or identity thieves) may know, guess, and/or discover the maiden name of the account owner's mother, thereby enabling that person to steal and/or spoof the account owner's identity and/or gain illegitimate access to his or her online account.

Accordingly, to be effective in verifying a person's alleged identity, KBA may need to rely on questions that have high entropy. In this context, the term "entropy" may refer to the level of difficulty, unlikelihood, and/or improbability involved in guessing and/or discovering the answer to a question about another person. For example, a high-entropy question may be difficult or even impossible for someone to answer correctly about another person's life or experiences. Similarly, a question with high social entropy may be difficult or even impossible for someone to answer correctly about another person's life or experiences despite all the information available on social media about that other person.

The instant disclosure, therefore, identifies and addresses a need for additional and improved methods, systems, and apparatuses for selecting questions for KBA based on social entropy.

SUMMARY

As will be described in greater detail below, the instant disclosure describes various systems and methods for selecting questions for KBA based on social entropy. In one example, a computer-implemented method for selecting questions for KBA based on social entropy may include (1) identifying a potential question to ask a user of a computing system during a KBA process in an attempt to verify the user's identity, (2) determining whether any information suggestive of a correct answer to the potential question is available to anyone other than the user of the computing system, (3) calculating a social entropy of the potential question based at least in part on the determination of whether any information suggestive of the correct answer is available to anyone other than the user, and then (4) selecting the potential question to be asked to the user during the KBA process based at least in part on the social entropy of the potential question.

In one example, the method may also include identifying a level of information suggestive of the correct answer that is available to at least one person other than the user. For example, the method may include calculating the social entropy of the potential question as a function of the level of information suggestive of the correct answer. In this example, the method may further include determining that the level of information suggestive of the correct answer is below a certain informational threshold.

In one example, the method may also include determining that the social entropy of the potential question is above a certain entropy threshold. For example, the method may include determining that no information suggestive of the correct answer is available to anyone other than the user. In this example, the method may include selecting the potential question in response to the determination that the social entropy of the potential question is above the certain entropy threshold.

In one example, the method may also include determining whether any information suggestive of the correct answer is available online. For example, the method may further include determining whether any information suggestive of the correct answer is published on social media. Additionally or alternatively, the method may include determining whether any information suggestive of the correct answer is accessible to one or more people who have connected with the user on social media.

In one example, the method may also include identifying another potential question to ask the user of the computing system during the KBA process. In this example, the method may further include determining a level of information suggestive of a correct answer to the other potential question that is available to at least one person other than the user. Additionally or alternatively, the method may include determining that the level of information suggestive of the correct answer to the other potential question is above a certain informational threshold. The method may then include calculating a social entropy of the other potential question based at least in part on the determination that the level of information suggestive of the correct answer is above the certain informational threshold. Finally, the method may include preventing the other potential question from being asked to the user during the KBA process based at least in part on the social entropy of the potential question.

In one example, the method may also include identifying at least one other potential question to ask the user of the computing system during the KBA process. In this example, the method may include determining a level of information suggestive of a correct answer to the other potential question that is available to at least one person other than the user. Additionally or alternatively, the method may include calculating a social entropy of the other potential question based at least in part on the determination that the level of information suggestive of the correct answer to the other potential question. Finally, the method may include ranking the potential question and the other potential question with respect to social entropy.

In one example, the method may also include determining that the potential question is ranked higher than the other potential question with respect to social entropy. In this example, the method may further include selecting the potential question to be asked to the user due at least in part to the potential question being ranked higher than the other potential question with respect to social entropy.

In one example, the method may also include identifying a context of the KBA process. In this example, the method may further include determining that certain information suggestive of the correct answer is likely available to at least one person other than the user. Additionally or alternatively, the method may include determining that the certain information likely being available to the person other than the user is permissible in the context of the KBA process. Finally, the method may include disregarding the determination that the certain information is likely available to the person other than the user in the calculation of the social entropy of the potential question.

In one example, the method may also include checking for any information suggestive of the correct answer by way of crowdsourcing. In this example, the method may further include crawling social media of the user for any information suggestive of the correct answer.

In another example, a system for implementing the above-described method may include (1) an identification module, stored in memory, that identifies a potential question to ask a user of a computing system during a KBA process in an attempt to verify the user's identity, (2) a determination module, stored in memory, that determines whether any information suggestive of a correct answer to the potential question is available to anyone other than the user of the computing system, (3) an entropy module, stored in memory, that calculates a social entropy of the potential question based at least in part on the determination of whether any information suggestive of the correct answer is available to anyone other than the user, (4) a selection module, stored in memory, that selects the potential question to be asked to the user during the KBA process based at least in part on the social entropy of the potential question, and (5) at least one physical processor configured to execute the identification module, the determination module, the entropy module, and the selection module.

In an additional example, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a potential question to ask a user of a computing system during a KBA process in an attempt to verify the user's identity, (2) determine whether any information suggestive of a correct answer to the potential question is available to anyone other than the user of the computing system, (3) calculate a social entropy of the potential question based at least in part on the determination of whether any information suggestive of the correct answer is available to anyone other than the user, and then (4) select the potential question to be asked to the user during the KBA process based at least in part on the social entropy of the potential question.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of an exemplary potential question, an exemplary correct answer, and exemplary social media.

FIG. 6 is an illustration of an exemplary potential question, an exemplary correct answer, and exemplary telemetry data.

Figure 1:
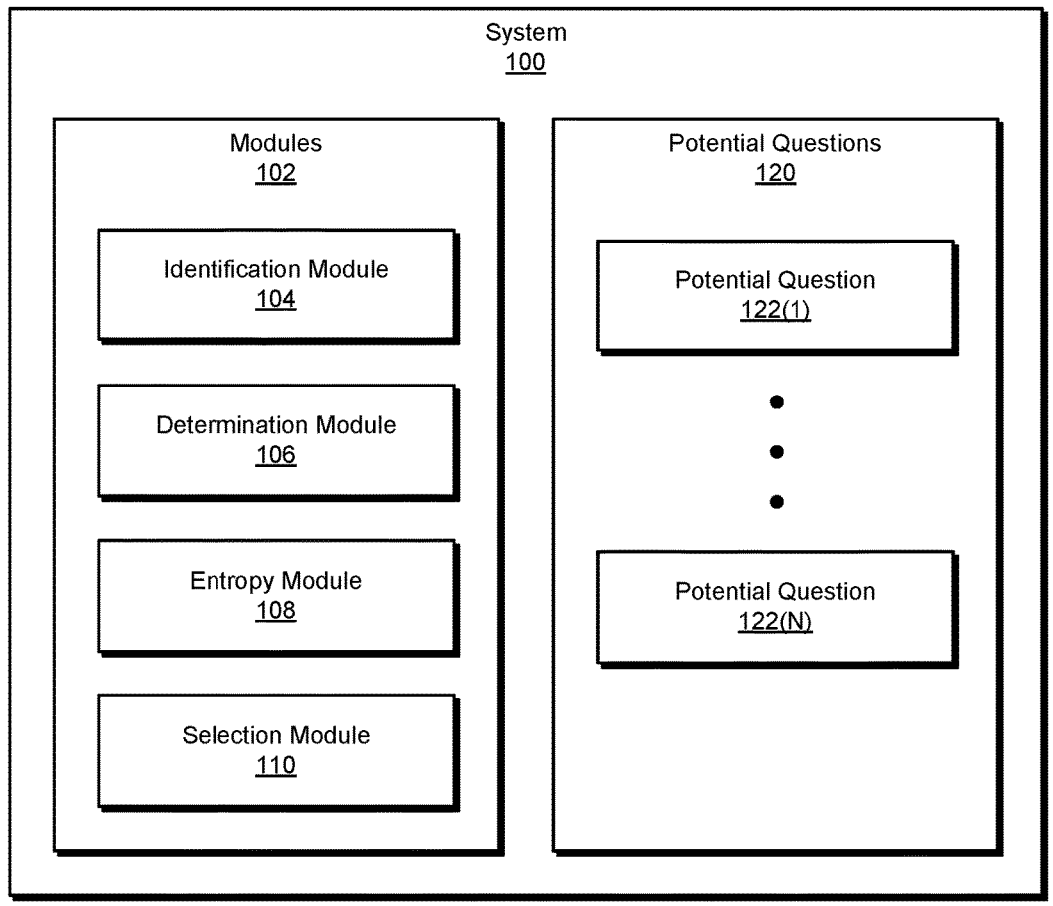
FIG. 1 is a block diagram of an exemplary system for selecting questions for KBA based on social entropy.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for selecting questions for KBA based on social entropy. As will be explained in greater detail below, by calculating the social entropy of questions available for use in a KBA process, the various systems and methods described herein may select only those questions with high social entropy to verify the identity of the person undergoing the KBA process. By selecting only those questions with high social entropy in this way, the various systems and methods described herein may be able to strengthen and/or improve the accuracy or results of verifying someone's identity with KBA. In other words, these systems and methods may increase the difficulty, unlikelihood, and/or improbability of stealing and/or spoofing someone else's identity or gaining illegitimate access to his or her online account.

The term "knowledge-based authentication" and the abbreviation "KBA," as used herein, generally refers to any type or form of process and/or procedure intended to authenticate, verify, rebut, or dispute the alleged identity of a person or user of a computing system. For example, a KBA process may involve asking one or more questions to a user of a computing system who is attempting to gain access to an online account. In this example, the questions may be designed to call for and/or prompt an answer that only the owner of the online account could know and/or provide.

The term "entropy," as used herein, generally refers to the level of difficulty, unlikelihood, and/or improbability involved in guessing, knowing, and/or discovering the correct answer to a question about another person. Similarly, the term "social entropy," as used herein, generally refers to the level of difficulty, unlikelihood, and/or improbability involved in guessing, knowing, and/or discovering the correct answer to a question about another person in view of all the information available online and/or by way of social media. For example, a person may be unlikely to correctly answer a question about someone he or she does not know personally if that question has high social entropy. In contrast, a person may be more likely to correctly answer a question about someone he or she does not know personally if that question has low social entropy.

Figure 2:
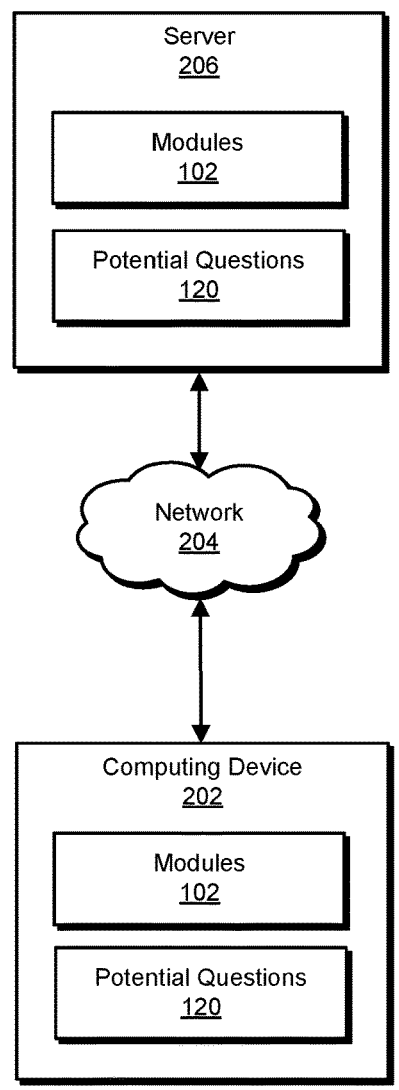
FIG. 2 is a block diagram of an additional exemplary system for selecting questions for KBA based on social entropy.

The following will provide, with reference to FIGS. 1 and 2, detailed descriptions of exemplary systems for selecting questions for KBA based on social entropy. Detailed descriptions of corresponding computer-implemented methods will be provided in connection with FIG. 3. Detailed descriptions of exemplary potential questions, correct answers, telemetry data, and/or social media will be provided in connection with FIGS. 4-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for selecting questions for KBA based on social entropy. As illustrated in this figure, exemplary system 100 may include one or more modules 102 for performing one or more tasks. For example, and as will be explained in greater detail below, exemplary system 100 may include an identification module 104 that identifies a potential question to ask a user of a computing system during a KBA process in an attempt to verify the user's identity. Exemplary system 100 may also include a determination module 106 that determines whether any information suggestive of a correct answer to the potential question is available to anyone other than the user of the computing system.

In addition, and as will be described in greater detail below, exemplary system 100 may include an entropy module 108 that calculates a social entropy of the potential question based at least in part on the determination of whether any information suggestive of the correct answer is available to anyone other than the user. Moreover, exemplary system 100 may include a selection module 110 that selects the potential question to be asked to the user during the KBA process based at least in part on the social entropy of the potential question. Although illustrated as separate elements, one or more of modules 102 in FIG. 1 may represent portions of a single module or application (such as an account recovery application).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include a set of potential questions 120. In one example, the set of potential questions 120 may include a potential question 122(1) and a potential question 122(N). Additionally or alternatively, the set of potential questions 120 may include various other questions not illustrated in FIG. 1. Set of potential questions 120 may be available for use in a KBA process designed to verify or dispute the alleged identity of a user attempting to gain access to an online account.

The term "potential question," as used herein, generally refers to any type or form of inquiry, query, and/or problem that could potentially be used in a KBA process. In some examples, potential question 122(1) or 122(N) may call for and/or prompt a reply when asked to a user of a computing system. In one example, potential question 122(1) may have a single correct answer. In another example, potential question 122(1) may have various correct answers. When potential questions 122(1)-(N) are answered correctly, these answers may serve as evidence for or against the alleged identity of a user during a KBA process. In other words, these answers may help substantiate or rebut the user's allegation that he or she is a particular person.

Examples of potential questions 122(1)-(N) include, without limitation, "Who was your employer in 2007?", "What is your mother's maiden name?", "Which restaurant did you dine at last Friday night?", "Which college rejected your application for admission?", "What was the name of your first pet?", "What are the last four digits of your social security number?", "Who is your celebrity crush?", "What is your favorite movie?", "What is your favorite music group?", "Who is your favorite sibling?", variations or combinations of one or more of the same, and/or any other suitable potential questions.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. Additionally or alternatively, computing device 202 may include and/or store the set of potential questions 120.

Similarly, server 206 may be programmed with one or more of modules 102. Additionally or alternatively, computing device 202 may include and/or store the set of potential questions 120.

In one embodiment, one or more of modules 102 from FIG. 1 may, when executed by at least one processor of computing device 202 and/or server 206, enable computing device 202 and/or server 206 to select questions for KBA based on social entropy. For example, and as will be described in greater detail below, one or more of modules 102 may cause computing device 202 and/or server 206 to (1) identify potential question 120(1) to ask a user of computing system 202 during a KBA process in an attempt to verify the user's identity, (2) determine whether any information suggestive of a correct answer to potential question 120(1) is available to anyone other than the user of computing system 202, (3) calculate a social entropy of potential question 120(1) based at least in part on the determination of whether any information suggestive of the correct answer is available to anyone other than the user, and then (4) select potential question 120(1) to be asked to the user during the KBA process based at least in part on the social entropy of potential question 120(1).

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations or variations of one or more of the same, exemplary computing system 710 in FIG. 7, or any other suitable computing device.

Server 206 generally represents any type or form of computing device capable of selecting and/or distributing questions for KBA based on social entropy. Examples of server 206 include, without limitation, security servers, application servers, web servers, storage servers, and/or database servers configured to run certain software applications and/or provide various security, web, storage, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing device 202 and server 206.

Figure 3:
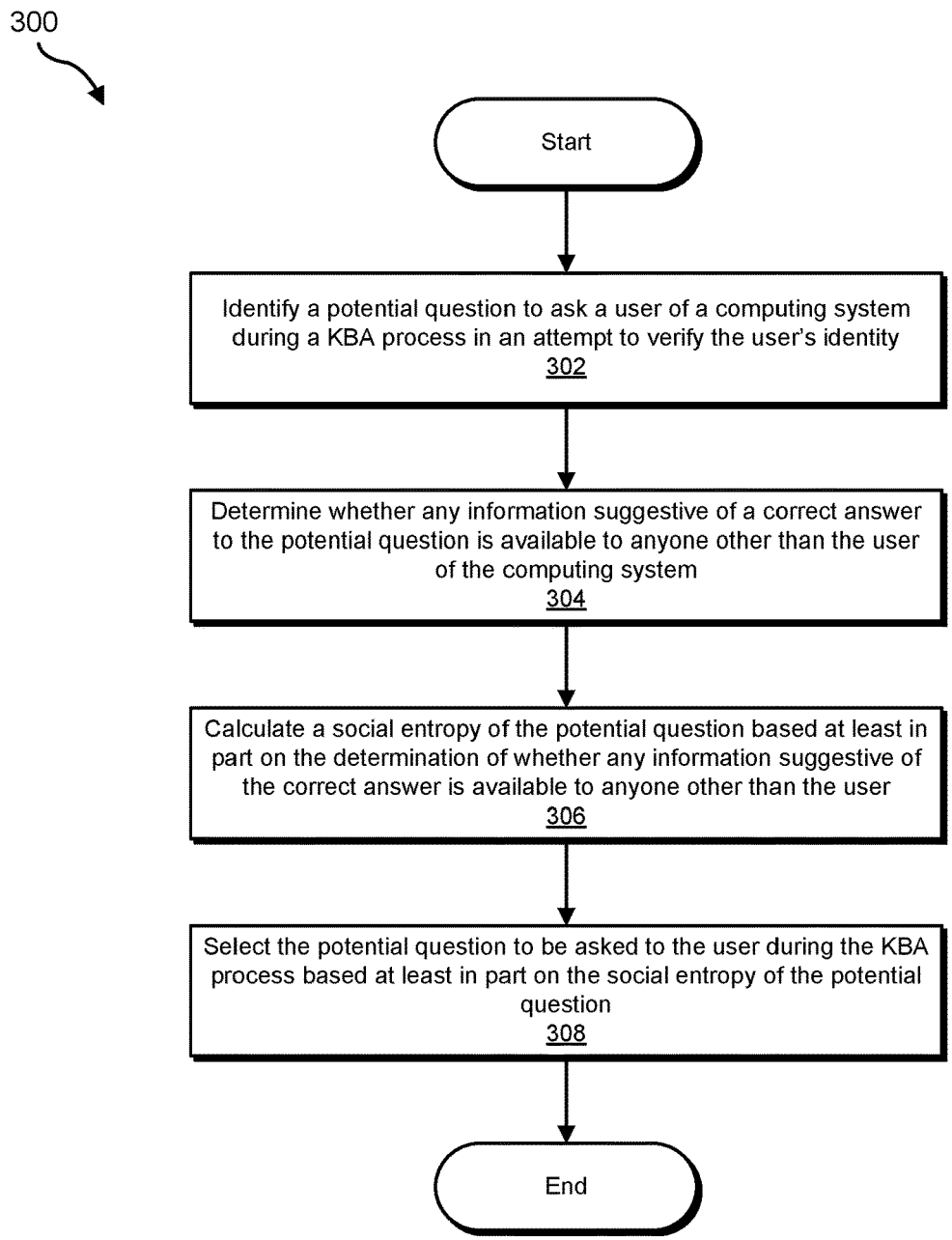
FIG. 3 is a flow diagram of an exemplary method for selecting questions for KBA based on social entropy.

FIG. 3 is a flow diagram of an exemplary computer-implemented method 300 for selecting questions for KBA based on social entropy. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may identify a potential question to ask a user of a computing system during a KBA process in an attempt to verify the user's identity. For example, identification module 104 may, as part of computing device 202 and/or server 206 in FIG. 2, identify potential question 122(1) to ask a user of computing device 202 during a KBA process in an attempt to verify the user's identity. In this example, the KBA process may include and/or involve private information about the owner of the online account and/or shared secrets associated with the owner of the online account. Additionally or alternatively, the KBA process may include and/or represent static and/or dynamic KBA.

The systems described herein may perform step 302 in a variety of ways and/or contexts. In some examples, identification module 104 may identify potential question 122(1) by enumerating and/or iterating set of potential questions 120. For example, identification module 104 may enumerate and/or iterative set of potential questions 120. While enumerating and/or iterating set of potential questions 120, identification module 104 may identify potential question 122(1). Additionally or alternatively, while enumerating and/or iterating set of potential questions 120, identification module 104 may identify potential question 122(N).

In some examples, identification module 104 may identify potential question 122(1) in response to the initiation of the KBA process. For example, identification module 104 may detect the initiation and/or launching of a KBA process intended to verify or dispute the alleged identity of the user operating computing device 202. In this example, the user may be attempting to gain access to an online account for which he or she does not know and/or remember the correct password. In response to the initiation and/or launching of this KBA process, identification module 104 may identify potential question 122(1) to facilitate calculating the social entropy of potential question 122(1) with respect to that specific user.

Returning to FIG. 3, at step 304 one or more of the systems described herein may determine whether any information suggestive of a correct answer to the potential question is available online. For example, determination module 106 may, as part of computing device 202 and/or server 206 in FIG. 2, determine whether any information suggestive of a correct answer to potential question 122(1) is available to anyone other than the user of computing system 202. This information may explicitly identify and/or specify a correct answer to potential question 122(1). Additionally or alternatively, this information may allude to, hint at, and/or be used to deduce a correct answer to potential question 122(1).

The systems described herein may perform step 304 in a variety of ways and/or contexts. In some examples, determination module 106 may determine whether any information suggestive of a correct answer to potential question 122(1) is available to anyone other than the user by crawling at least a portion of the Internet. For example, determination module 106 may deploy a web crawler that crawls the user's social media in search of information that identifies and/or could potentially be used to deduce a correct answer to potential question 122(1). In this example, the web crawler may crawl certain social media profiles of the account owner and/or social media posts made by the account owner. Additionally or alternatively, the web crawler may crawl certain social media profiles of anyone other than the account owner (e.g., a family member, friend, or colleague) who is implicated by potential question 122(1) as well as any social media posts made by anyone other than the account owner who is implicated by potential question 122(1). The web crawler may also crawl any other social media profiles and/or posts that mention and/or implicate the account owner.

Continuing with this example, determination module 106 may determine that at least some information suggestive of a correct answer to potential question 122(1) has been published on social media. Alternatively, determination module 106 may determine that no information suggestive of a correct answer to potential question 122(1) has been published on social media. Examples of social media include, without limitation, FACEBOOK, TWITTER, INSTAGRAM, LINKEDIN, MYSPACE, GOOGLE+, TAGGED, MYYEARBOOK, MEETUP, MYLIFE, MYHERITAGE, MULTIPLY, ORKUT, NING, CLASSMATES.COM, BEBO, FRIENDSTER, HI5, ORKUT, PERFSPOT, ZORPIA, NETLOG, HABBO, blogs, variations of one or more of the same, and/or any other websites or applications that facilitate online social media and/or networking.

In one example, determination module 106 may determine that at least some information suggestive of a correct answer to one of potential questions 120 is accessible to people who have connected with the account owner on social media. For example, determination module 106 may determine that a FACEBOOK friend of the account owner is able to access and/or view a FACEBOOK post in which the account owner disclosed certain personal information that includes a correct answer to potential question 122(N). Alternatively, determination module 106 may determine that the account owner has not made any FACEBOOK posts and/or publications that disclose personal information that could be used to deduce a correct answer to potential question 122(N).

Examples of such personal information include, without limitation, the account owner's employer from 2007, his or her mother's maiden name, where he or she dined last Friday night, which college rejected his or her admissions application, the name of his or her first pet, his or her celebrity crush, his or her favorite movie, his or her favorite music group, his or her favorite sibling, combinations or variations of one or more of the same, and/or any other information that could potentially be used to deduce a correct answer to a potential question.

Figure 4:
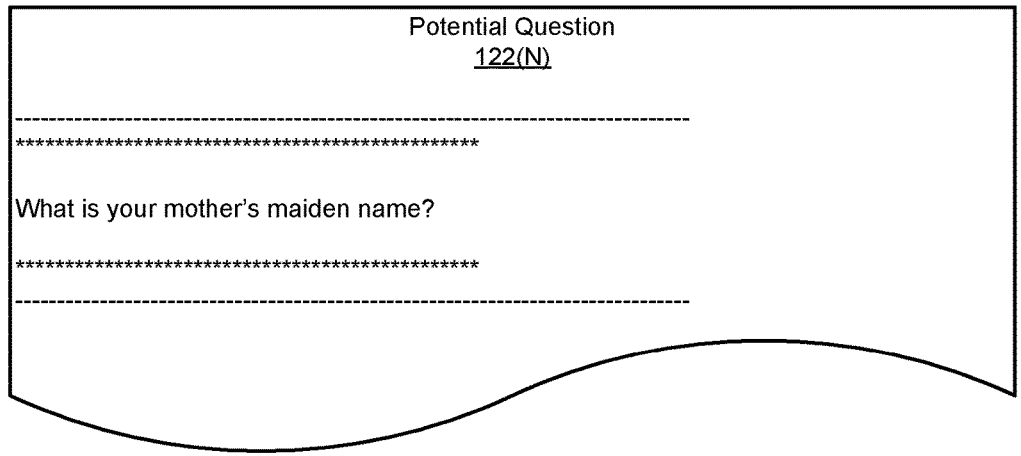
FIG. 4 is an illustration of an exemplary potential question, an exemplary correct answer, and exemplary social media.
Figure 4:
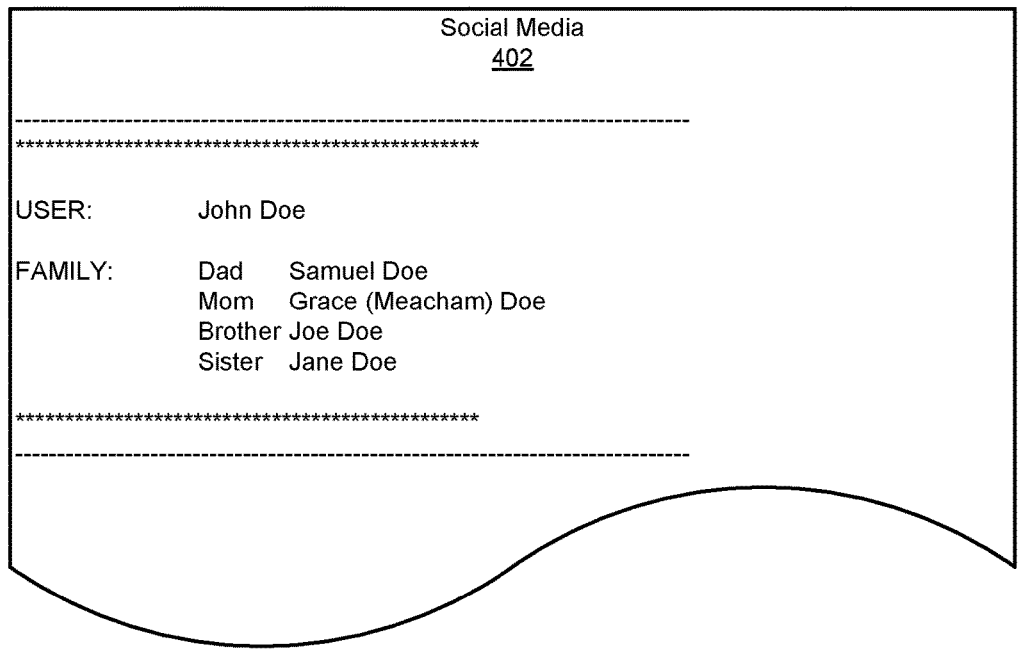

As another example, identification module 104 may identify potential question 122(N) in FIG. 4. As illustrated in FIG. 4, potential question 122(N) may be represented as "What is your mother's maiden name?". Upon identification of potential question 122(N), determination module 106 may determine that certain friends of the user on social media have access to personal information that includes the correct answer to potential question 122(N). For example, a web crawler may crawl the user's FACEBOOK profile.

While crawling the user's FACEBOOK profile, the web crawler may identify social media 402. As illustrated in FIG. 4, social media 402 may identify and/or indicate a user (in this example, "John Doe") and a description of the user's family (in this example, "Dad" is "Samuel Doe", "Mom" is "Grace (Meacham) Doe", "Brother" is "Joe Doe", and "Sister" is "Jane Doe"). In this example, determination module 106 may deduce and/or conclude that the maiden name of the user's mother is Meacham based at least in part on social media 402. Accordingly, at least some of the user's FACEBOOK friends may be able to access and/or view social media 402 and thus find out the correct answer to potential question 122(N).

In another example, determination module 106 may determine that a LINKEDIN connection of the user is able to access and/or view certain personal information disclosed by the user in his or her LINKEDIN profile. Alternatively, determination module 106 may determine that the user has not made any LINKEDIN posts and/or publications that disclose personal information that could be used to deduce a correct answer to one of potential questions 120.

As a specific example, identification module 104 may identify potential question 122(2) in FIG. 5. As illustrated in FIG. 5, potential question 122(2) may be represented as "Who was your employer in 2007?". Upon identification of potential question 122(2), determination module 106 may determine that certain connections of the user on social media have access to personal and/or resume information that includes the correct answer to potential question 122(2). For example, a web crawler may crawl the user's LINKEDIN profile.

While crawling the user's LINKEDIN profile, the web crawler may identify social media 502. As illustrated in FIG. 5, social media 502 may identify and/or indicate a user (in this example, "John Doe") and an employment history (in this example, "SuperStore October 2001-December 2005", "MegaTech January 2006-August 2011", and "HopeFinancial September 2011-Present"). In this example, determination module 106 may deduce and/or conclude that the user worked at MegaTech in 2007 based at least in part on social media 502. Accordingly, at least some of the user's LINKEDIN connections may be able to access and/or view social media 502 and thus find out the correct answer to potential question 122(2).

In some examples, determination module 106 may determine whether any information suggestive of a correct answer to one of potential questions 120 is available to anyone other than the account owner by way of crowdsourcing and/or telemetry data (such as the account owner's credit history, backend account data, personal device data, vehicle data, and/or smart home data). For example, a technology company (e.g., a security software vendor) may collect and/or maintain certain data from its users' mobile devices at server 206 and/or another computing device (not necessarily illustrated in FIG. 2). In this example, server 206 and/or the other computing device may be able to cluster and/or match some of the data across the mobile devices of multiple users. Determination module 106 may then determine that someone other than the account owner (e.g., another user whose data was collected from his or her mobile device) knows the correct answer to potential question 120(1) based at least in part on the clustered and/or matching data. Alternatively, determination module 106 may determine that the clustered and/or matching data does not indicate and/or suggest that anyone other than the account owner knows the correct answer to potential question 120(1).

As a specific example, identification module 104 may identify potential question 122(1) in FIG. 6. As illustrated in FIG. 6, potential question 122(1) may be represented as "Which restaurant did you dine at last Friday night?". Upon identification of potential question 122(1), determination module 106 may determine, by way of crowdsourcing, that the user's spouse knows the answer to that question. For example, security software running on computing device 202 may obtain geolocation information (such as Global Positioning System (GPS) coordinates) indicating that the user was located at a Pepper Garden restaurant last Friday night. In this example, the security software running on computing device 202 may direct computing device 202 to send this geolocation information to server 206 via network 204.

Similarly, security software running on the mobile device (not illustrated in FIG. 2) of the user's spouse may obtain geolocation information (such as Global Positioning System (GPS) coordinates) indicating that the user's spouse was located at the same Pepper Garden restaurant last Friday night. In this example, the security software running on the spouse's mobile device may direct that mobile device to send this geolocation information to server 206 via network 204. As the geolocation information from these devices reaches server 206, determination module 106 may deduce and/or conclude that the user and his or her spouse were both dining at the Pepper Garden restaurant together last Friday night based at least in part on the geolocation information. As a result, the user's spouse may know the correct answer to potential question 122(1) in FIG. 6.

Alternatively, server 206 may obtain telemetry data 602 in FIG. 6 from a banking institution or service of the user. In one example, telemetry data 602 may include and/or represent a financial disclosure (such as a credit card statement and/or payment history) of the user. As illustrated in FIG. 6, telemetry data 602 may identify and/or indicate a user (in this example, "John Doe"), a location or business (in this example, "Pepper Garden in Palo Alto, Calif."), a date (in this example, "Friday, 4 Mar. 2016"), a time (in this example, "8:10 PM PST"), and/or a payment amount (in this example, "$89.49"). In this example, determination module 106 may deduce and/or conclude that the user dined at the Pepper Garden restaurant last Friday night based at least in part on telemetry data 602.

In some examples, determination module 106 may determine the level of information suggestive of the correct answer is available to anyone other than the account owner. In one example, determination module 106 may determine whether the available information is sufficient to deduce the correct answer to potential question 122(1). For example, identification module 104 may identify online information indicating that the account owner likes the Pepper Garden restaurant. However, identification module 104 may fail to find any information indicating and/or suggesting that the user dined at the Pepper Garden restaurant last Friday night. As a result, determination module 106 may determine that the level of information disclosed online is below the informational threshold necessary to deduce the correct answer to 122(1).

As another example, identification module 104 may identify online information indicating that a photograph posted to the account owner's blog shows his or her mother's side of the family. In this example, the photograph may have a caption that refers to the subjects of the photograph as members of the Meacham family. As a result, determination module 106 may determine that the level of information disclosed on the account owner's blog is above the informational threshold necessary to deduce the correct answer to 122(N).

Returning to FIG. 3, at step 306 one or more of the systems described herein may calculate a social entropy of the potential question based at least in part on the determination of whether any information suggestive of the correct answer is available to anyone other than the user. For example, entropy module 108 may, as part of computing device 202 and/or server 206 in FIG. 2, calculate the social entropy of potential question 122(1) based at least in part on the determination of whether any information suggestive of the correct answer is available to anyone other than the user. In this example, the social entropy of potential question 122(1) may be represented as a number or score.

The systems described herein may perform step 306 in a variety of ways and/or contexts. In some examples, entropy module 108 may calculate the social entropy of potential question 122(1) using any type or form of algorithm. In one example, entropy module 108 may calculate the social entropy of potential question 122(1) as a function of the level of information suggestive of the correct answer that is available online. For example, entropy module 108 may calculate a social entropy score of 95 (on a scale between 1 and 100) for potential question 122(1) since little, if any, information suggestive of the correct answer to potential question 122(1) is available on the account owner's social media.

In another example, entropy module 108 may calculate a social entropy score of 3 for potential question 122(2) (on a scale between 1 and 100) since the account owner's LINKEDIN profile explicitly discloses the correct answer to potential question 122(2). In a further example, entropy module 108 may calculate a social entropy score of 24 for potential question 122(N) (on a scale between 1 and 100) since the account owner's FACEBOOK profile discloses information that at least strongly suggests that the correct answer to potential question 122(N) is Meacham.

In one example, determination module 106 may determine whether the social entropy of any of potential questions 120 is above a certain entropy threshold. For example, identification module 104 may identify 90 as the entropy threshold. In this example, determination module 106 may determine that the social entropy score of 95 for potential question 122(1) is above the entropy threshold of 90. In contrast, determination module 106 may determine that the social entropy score of 3 for potential question 122(2) is below the entropy threshold of 90. Similarly, determination module 106 may determine that the social entropy score of 24 for potential question 122(N) is below the entropy threshold of 90.

In some examples, entropy module 108 may rank potential questions 120 with respect to and/or in order of social entropy. For example, identification module 104 may identify which of potential questions 120 has the highest social entropy and/or which of potential questions 120 has the second highest social entropy. In this example, entropy module 108 may note and/or mark the potential question with the highest social entropy as well as the potential question with the second highest social entropy. Additionally or alternatively, entropy module 108 may establish and/or form a list that identifies potential questions 120 in order of social entropy.

In certain examples, the context of the KBA process may have some importance. In one example, the KBA process may involve accessing and/or recovering an online account jointly owned by the user and his or her spouse. Since, in this example, the user's spouse also has a right to access and/or recover the joint online account, entropy module 108 may disregard and/or ignore the fact that the user's spouse likely knows the correct answer to any of potential questions 120 when calculating the social entropy of those questions. In other words, the fact that the user's spouse likely knows the correct answer to any of potential questions 120 may have little, if any, negative effect on the social entropy of those questions.

In some examples, entropy module 108 may weight some factors more than others when calculating the social entropy of potential questions 120. For example, entropy module 108 may weight a spouse's knowledge of the correct answer to potential question 122(1) differently than a mere acquaintance's knowledge of the correct answer to potential question 122(1). In this example, the spouse's knowledge of the correct answer may have little, if any, negative effect on the social entropy of potential question 122(1). In contrast, the acquaintance's knowledge of the correct answer may have a significantly negative effect on the social entropy of potential question 122(1).

In some examples, entropy module 108 may distinguish between certainty and speculation when calculating the social entropy of potential questions 120. Accordingly, indisputable proof that an account owner has disclosed the answer to one of potential questions 120 may have a more negative effect on the social entropy calculation of that potential question than speculation and/or suspicion of someone else's knowledge of the answer. For example, identification module 104 may identify another potential question to ask the user during the KBA process. In this example, the other potential question may be "What is your current job title?", and the answer to the other potential question may be "mortgage broker".

In response to the identification of this other potential question, determination module 106 may determine that the account owner's LINKEDIN profile identifies his or her current job title as mortgage broker. In response, determination module 106 may conclude that the account owner indisputably disclosed the answer to the other potential question. As a result, entropy module 108 may calculate the social entropy of the other potential question to be 1 (on a scale between 1 and 100).

As another example, identification module 104 may identify an additional potential question to ask the user during the KBA process. In this example, the additional potential question may be "Which pub did you visit last Saturday night?", and the answer to the additional potential question may be "The Green Pig". Identification module 104 may then identify telemetry data collected from certain social media connections of the account owner. Some of the telemetry data may indicate that these social media connections of the account owner were also in attendance at The Green Pig pub last Saturday night.

Continuing with this example, determination module 106 may determine that these social media connections of the account owner are most likely aware (with, e.g., a 60% probability of knowing) that he or she was in attendance at The Green Pig pub last Saturday night. Accordingly, determination module 106 may postulate and/or speculate to some degree that these social media connections know the answer to the additional potential question. As a result, entropy module 108 may calculate the social entropy of the additional potential question to be 40 (on a scale between 1 and 100).

Returning to FIG. 3, at step 308 one or more of the systems described herein may select the potential question to be asked to the user during the KBA process based at least in part on the social entropy of the potential question. For example, selection module 110 may, as part of computing device 202 and/or server 206 in FIG. 2, select potential question 122(1) to be asked to the user during the KBA process based at least in part on the social entropy of potential question 122(1). In response to this selection, computing device 202 may display and/or present potential question 122(1) to the user in order to find out whether the user is truly the person that he or she is alleging.

The systems described herein may perform step 308 in a variety of ways and/or contexts. In some examples, selection module 110 may select potential question 122(1) in response to the determination that the social entropy of potential question 122(1) is above the entropy threshold. Additionally or alternatively, selection module 110 may select potential question 122(1) since, in this example, potential question 122(1) has the highest social entropy of potential questions 120.

In some examples, selection module 110 may select multiple potential questions to be asked to the user during the KBA process. For example, selection module 110 may select the three potential questions with the highest social entropy from potential questions 120 in accordance with the ranking. In response to this selection, computing device 202 may display and/or present those potential question with the highest social entropy to the user in order to find out whether the user is truly the account owner.

In one example, selection module 110 may preventing the some of potential questions 120 from being asked to the user during the KBA process based at least in part on the social entropy of those potential questions. For example, selection module 110 may prevent potential question 122(2) from being asked to the user during the KBA process since the social entropy of potential question 122(2) is too low. Additionally or alternatively, selection module 110 may prevent potential question 122(N) from being asked to the user during the KBA process since the social entropy of potential question 122(N) is too low.

By selecting only those questions with high social entropy in this way, selection module 110 may be able to strengthen and/or improve the accuracy or results of verifying someone's identity with KBA. In other words, selection module 110 may increase the difficulty, unlikelihood, and/or improbability of stealing and/or spoofing someone else's identity or gaining illegitimate access to his or her online account via KBA.

In some examples, the user may be able to prove his or her alleged identity by providing the correct answer to potential question 122(1) during the KBA process. As a result, the user may successfully gain access to and/or recover the online account at issue.

Alternatively, the user may fail the KBA process by providing an incorrect answer to potential question 122(1). As a result, the user may remain locked out of and/or be unable to recover the online account at issue.

As explained above in connection with FIGS. 1-6, an account recovery service may be able to substantiate and/or rebut the alleged identity of a user by way of KBA. For example, a user may claim that he or she is an account owner who has forgotten the sign-in credentials. In this example, the account recovery service may identify potential questions about the owner of the account at issue. The account recovery service may determine whether any information suggestive of the correct answers to the potential questions is available to anyone other than the account owner. Such information may originate from a variety of sources, including the account owner's credit history, backend account data, personal device, vehicle, smart home, and/or social media.

The account recovery service may generate a KBA stream for the account owner based at least in part on information collected from those sources. In addition, the account recovery service may generate similar KBA streams for other people (such as the account owner's family members, friends, and/or colleagues) whose information is collected and/or analyzed. The account recovery service may then compare the KBA stream of the account owner with the KBA streams of the other people. The result of this comparison may impact the social entropy of the potential questions about the account owner.

Upon completing the comparison, the account recovery service may calculate the social entropy of the potential questions about the account owner based at least in part on the KBA streams. In the event that the comparison reveals certain overlap among the KBA streams, this overlap may have a negative effect on the social entropy of certain potential questions. After calculating the social entropy of the potential questions, the account recovery service may select one or more of the potential questions with the highest social entropy for use in the KBA process. By selecting only those questions with high social entropy in this way, the account recovery service may be able to determine whether the user is, in fact, the account owner by greatly reducing the risk of spoofing and/or identity theft. The account recovery service may thus enable the account owner to recover his or her online account and/or prevent any identify thieves from gaining illegitimate access to his or her online account.

Figure 7:
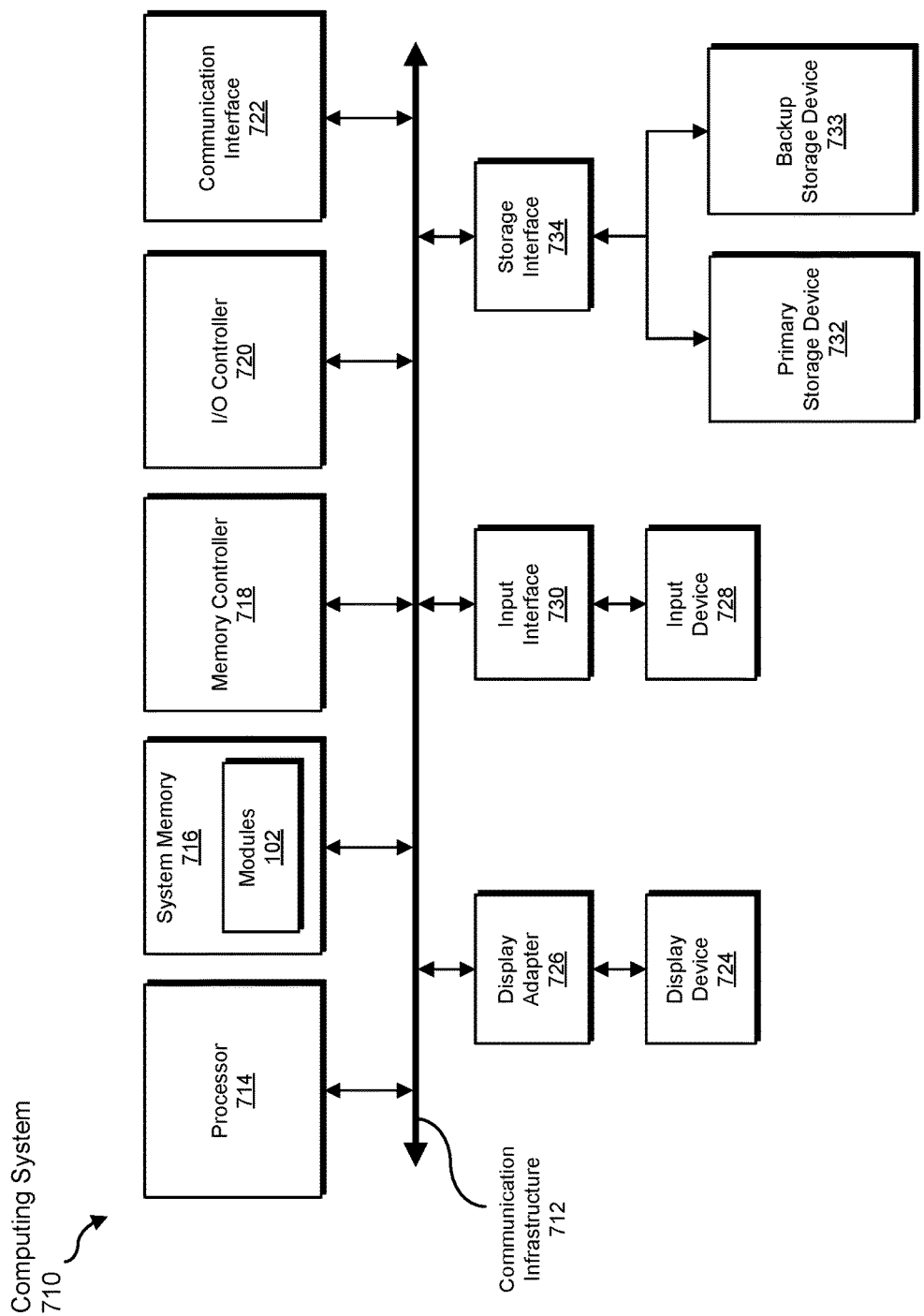
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
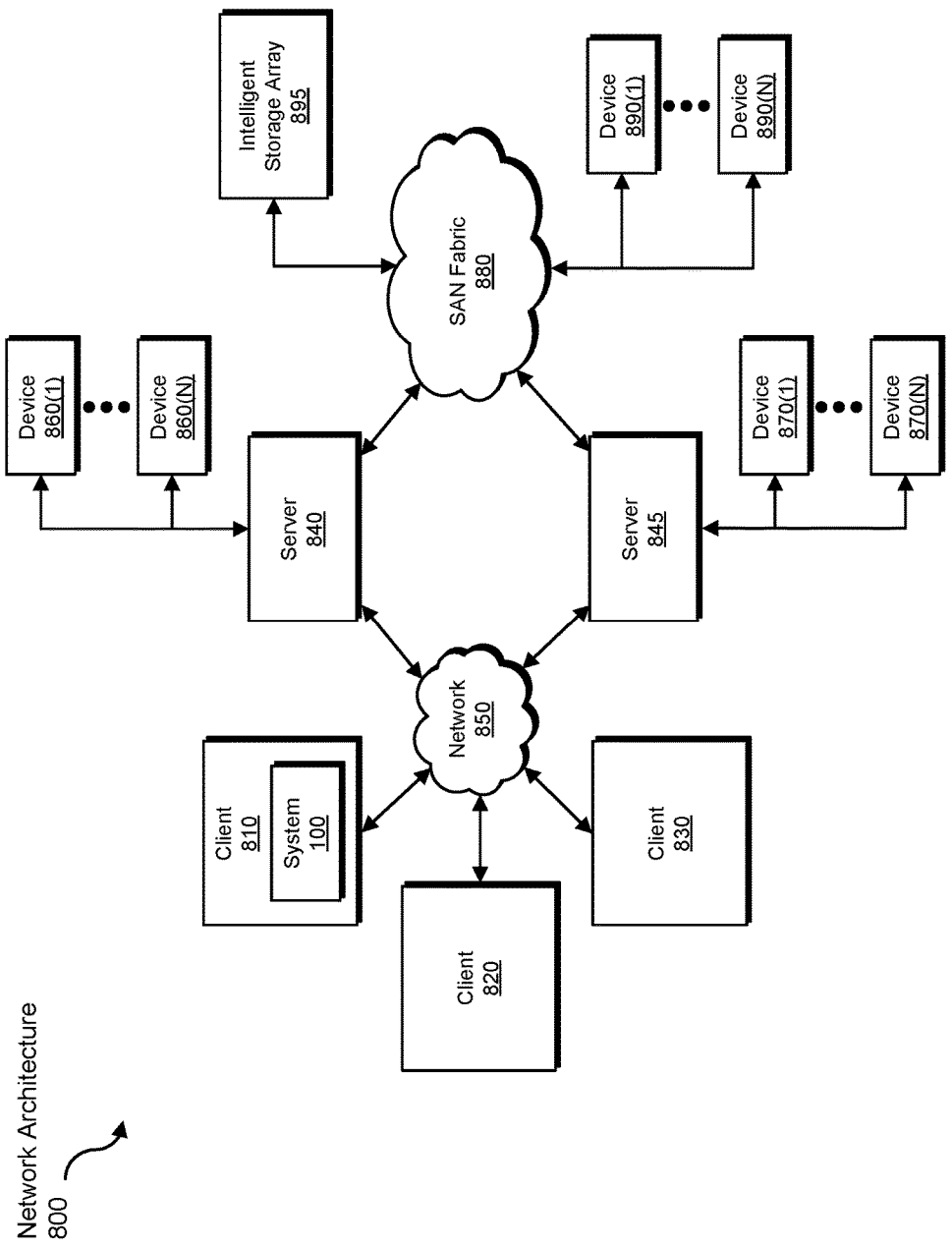
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for selecting questions for knowledge-based authentication based on social entropy.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for selecting questions for knowledge-based authentication based on social entropy, at least a portion of the method being performed by a computing device comprising at least one processor, the method comprising:
   identifying a potential question to ask a user of a computing system during a Knowledge-Based Authentication (KBA) process in an attempt to verify the user's identity;
   determining whether any information suggestive of a correct answer to the potential question is available to anyone other than the user of the computing system by determining whether any information suggestive of the correct answer is published online;
   calculating a social entropy of the potential question based at least in part on the determination of whether any information suggestive of the correct answer is published online; and
   ranking, with respect to social entropy, the potential question and at least one other potential question to ask the user of the computing system during the KBA process;
   determining that the potential question is ranked higher than the other potential question with respect to social entropy;
   selecting the potential question to be asked to the user during the KBA process due at least in part to the potential question being ranked higher than the other potential question with respect to social entropy; and
   upon selecting the potential question, performing the KBA process by asking the user the potential question due at least in part to the potential question being ranked higher than the other potential question with respect to social entropy.

2. The method of claim 1, wherein determining whether any information suggestive of the correct answer is available to anyone other than the user comprises:
   identifying a level of information suggestive of the correct answer that is available to at least one person other than the user; and
   determining that the level of information suggestive of the correct answer is below a certain informational threshold.

3. The method of claim 2, wherein calculating the social entropy of the potential question comprises calculating the social entropy of the potential question as a function of the level of information suggestive of the correct answer.

4. The method of claim 1, wherein determining whether any information suggestive of the correct answer is available to anyone other than the user comprises determining that no information suggestive of the correct answer is available to anyone other than the user.

5. The method of claim 1, wherein:
   calculating the social entropy of the potential question comprises determining that the social entropy of the potential question is above a certain entropy threshold; and
   selecting the potential question to be asked to the user during the KBA process comprises selecting the potential question in response to the determination that the social entropy of the potential question is above the certain entropy threshold.

6. The method of claim 1, wherein determining whether any information suggestive of the correct answer is available to anyone other than the user comprises at least one of:
   determining whether any information suggestive of the correct answer is published on social media; and
   determining whether any information suggestive of the correct answer is accessible to one or more people who have connected with the user on social media.

7. The method of claim 1, further comprising:
   identifying the other potential question to ask the user of the computing system during the KBA process;
   determining a level of information suggestive of a correct answer to the other potential question that is available to at least one person other than the user;
   determining that the level of information suggestive of the correct answer to the other potential question is above a certain informational threshold;
   calculating a social entropy of the other potential question based at least in part on the determination that the level of information suggestive of the correct answer is above the certain informational threshold; and
   preventing the other potential question from being asked to the user during the KBA process based at least in part on the social entropy of the potential question.

8. The method of claim 1, further comprising:
   identifying the other potential question to ask the user of the computing system during the KBA process;
   determining a level of information suggestive of a correct answer to the other potential question that is available to at least one person other than the user; and
   calculating a social entropy of the other potential question based at least in part on the determination that the level of information suggestive of the correct answer to the other potential question.

9. The method of claim 1, further comprising identifying a context of the KBA process; and wherein:
determining whether any information suggestive of the correct answer is available to anyone other than the user comprises determining that certain information suggestive of the correct answer is likely available to at least one person other than the user; and
calculating the social entropy of the potential question comprises:
determining that the certain information likely being available to the person other than the user is permissible in the context of the KBA process; and
in response to the determination that the certain information likely being available to the person other than the user is permissible in the context of the KBA process, disregarding the determination that the certain information is likely available to the person other than the user in the calculation of the social entropy of the potential question.

10. The method of claim 1, wherein determining whether any information suggestive of the correct answer is available to anyone other than the user comprises at least one of:
checking for any information suggestive of the correct answer by way of crowdsourcing; and
crawling social media of the user for any information suggestive of the correct answer.

11. A system for selecting questions for knowledge-based authentication based on social entropy, the system comprising:
an identification module, stored in memory, that identifies a potential question to ask a user of a computing system during a Knowledge-Based Authentication (KBA) process in an attempt to verify the user's identity;
a determination module, stored in memory, that determines whether any information suggestive of a correct answer to the potential question is available to anyone other than the user of the computing system by determining whether any information suggestive of the correct answer is published online;
an entropy module, stored in memory, that:
calculates a social entropy of the potential question based at least in part on the determination of whether any information suggestive of the correct answer is published online; and
ranks, with respect to social entropy, the potential question and at least one other potential question to ask the user of the computing system during the KBA process;
wherein the determination module determines that the potential question is ranked higher than the other potential question with respect to social entropy;
a selection module, stored in memory, that selects the potential question to be asked to the user during the KBA process due at least in part to the potential question being ranked higher than the other potential question with respect to social entropy; and
at least one physical processor that:
is configured to execute the identification module, the determination module, the entropy module, and the selection module; and
performs the KBA process by asking the user the potential question due at least in part to the potential question being ranked higher than the other potential question with respect to social entropy.

12. The system of claim 11, wherein:
the identification module identifies a level of information suggestive of the correct answer that is available to at least one person other than the user; and
the determination module determines that the level of information suggestive of the correct answer is below a certain informational threshold.

13. The system of claim 12, wherein the entropy module calculates the social entropy of the potential question as a function of the level of information suggestive of the correct answer.

14. The system of claim 11, wherein:
the entropy module determines that the social entropy of the potential question is above a certain entropy threshold; and
the selection module selects the potential question in response to the determination that the social entropy of the potential question is above the certain entropy threshold.

15. The system of claim 14, wherein the determination module at least one of:
determines whether any information suggestive of the correct answer is published on social media; and
determines whether any information suggestive of the correct answer is accessible to one or more people who have connected with the user on social media.

16. The system of claim 11, wherein:
the identification module identifies the other potential question to ask the user of the computing system during the KBA process;
the determination module:
determines a level of information suggestive of a correct answer to the other potential question that is available to at least one person other than the user; and
determines that the level of information suggestive of the correct answer to the other potential question is above a certain informational threshold;
the entropy module calculates a social entropy of the other potential question based at least in part on the determination that the level of information suggestive of the correct answer is above the certain informational threshold; and
the selection module prevents the other potential question from being asked to the user during the KBA process based at least in part on the social entropy of the potential question.

17. A non-transitory computer-readable medium comprising one or more computer-executable instructions that, when executed by at least one processor of a computing device, cause the computing device to:
identify a potential question to ask a user of a computing system during a Knowledge-Based Authentication (KBA) process in an attempt to verify the user's identity;
determine whether any information suggestive of a correct answer to the potential question is available to anyone other than the user of the computing system by determining whether any information suggestive of the correct answer is published online;
calculate a social entropy of the potential question based at least in part on the determination of whether any information suggestive of the correct answer is published online;
rank, with respect to social entropy, the potential question and at least one other potential question to ask the user of the computing system during the KBA process;
determine that the potential question is ranked higher than the other potential question with respect to social entropy;

select the potential question to be asked to the user during the KBA process due at least in part to the potential question being ranked higher than the other potential question with respect to social entropy; and perform the KBA process by asking the user the potential question due at least in part to the potential question being ranked higher than the other potential question with respect to social entropy.

\* \* \* \* \*